(12) United States Patent
Willner et al.

(10) Patent No.: US 6,760,013 B2
(45) Date of Patent: *Jul. 6, 2004

(54) HAND HELD GAMING AND DATA ENTRY SYSTEM

(75) Inventors: Michael A. Willner, Mason Neck, VA (US); Scott M. Arnel, Syosset, NY (US)

(73) Assignee: Alphagrip, Inc., Mason Neck, VA (US)

( * ) Notice: Subject to any disclaimer, the term of this patent is extended or adjusted under 35 U.S.C. 154(b) by 537 days.

This patent is subject to a terminal disclaimer.

(21) Appl. No.: 09/753,467

(22) Filed: Jan. 4, 2001

(65) Prior Publication Data

US 2001/0003713 A1 Jun. 14, 2001

Related U.S. Application Data

(63) Continuation-in-part of application No. 09/118,886, filed on Jul. 20, 1998.

(51) Int. Cl.[7] .................................................. G09G 5/00
(52) U.S. Cl. ...................................... 345/169; 345/163
(58) Field of Search ................... 400/489; 345/160–170

(56) References Cited

U.S. PATENT DOCUMENTS

| | | |
|---|---|---|
| 4,414,537 A | 11/1983 | Grimes |
| 4,791,408 A | 12/1988 | Huesinkveld |
| 4,974,183 A | 11/1990 | Miller |
| 5,087,910 A | 2/1992 | Guyot-Sionnest |
| 5,189,403 A | 2/1993 | Franz et al. |
| 5,267,127 A | 11/1993 | Pollitt |
| 5,352,050 A | 10/1994 | Choate |
| 5,410,333 A | 4/1995 | Conway |
| 5,581,484 A | 12/1996 | Prince |
| 5,605,406 A | 2/1997 | Bowen |
| D386,544 S | 11/1997 | Kajikawa et al. |
| 5,874,906 A | 2/1999 | Willner et al. |
| 5,984,548 A | 11/1999 | Willner et al. |
| 6,132,118 A * | 10/2000 | Grezeszak ................... 400/489 |
| 6,288,709 B1 * | 9/2001 | Willner et al. ............... 345/169 |

FOREIGN PATENT DOCUMENTS

DE          308048          9/1918

OTHER PUBLICATIONS

P.J. Kennedy, "Hand–Held Data Input Device", IBM Technical Disclosure Bulletin, vol. 26, No. 11, Apr. 1984, pp. 5826–5827.
"Compact Computer Keyboard", IBM Technical Disclosure Bulletin, vol. 27, No. 10A, Mar. 1995, pp. 5640–5642.
R.J. Bamford, et al., "Chord Keyboard with Case Lock and Chord Definition Features", IBM Technical Disclosure Bulletin, vol. 21, No. 7, Dec. 1978, pp. 2929–2932.
D.C. Kowalski, "Semi–Captive Keyboard", Xerox Disclosure Journal, vol. 1, No. 2, Feb. 1976, p. 85.

* cited by examiner

*Primary Examiner*—Steven Saras
*Assistant Examiner*—Srilakshmi Kumar
(74) *Attorney, Agent, or Firm*—Rosenberg, Klein & Lee

(57) ABSTRACT

A hand held gaming and data entry system (100, 100', 100") has an ergonomic housing (102) including thumb operated controls (104) which generate a first set of electrical signals, and finger operated controls (106, 106') which generate a second set of electrical signals when operated independently. The first set of electrical signals and second set of electrical signals define all of the lower case alphabetic characters of an alphabet, such being generated without the user having to remove a finger or thumb from a HOME switch operator or switch grouping.

7 Claims, 11 Drawing Sheets

FIG. 3

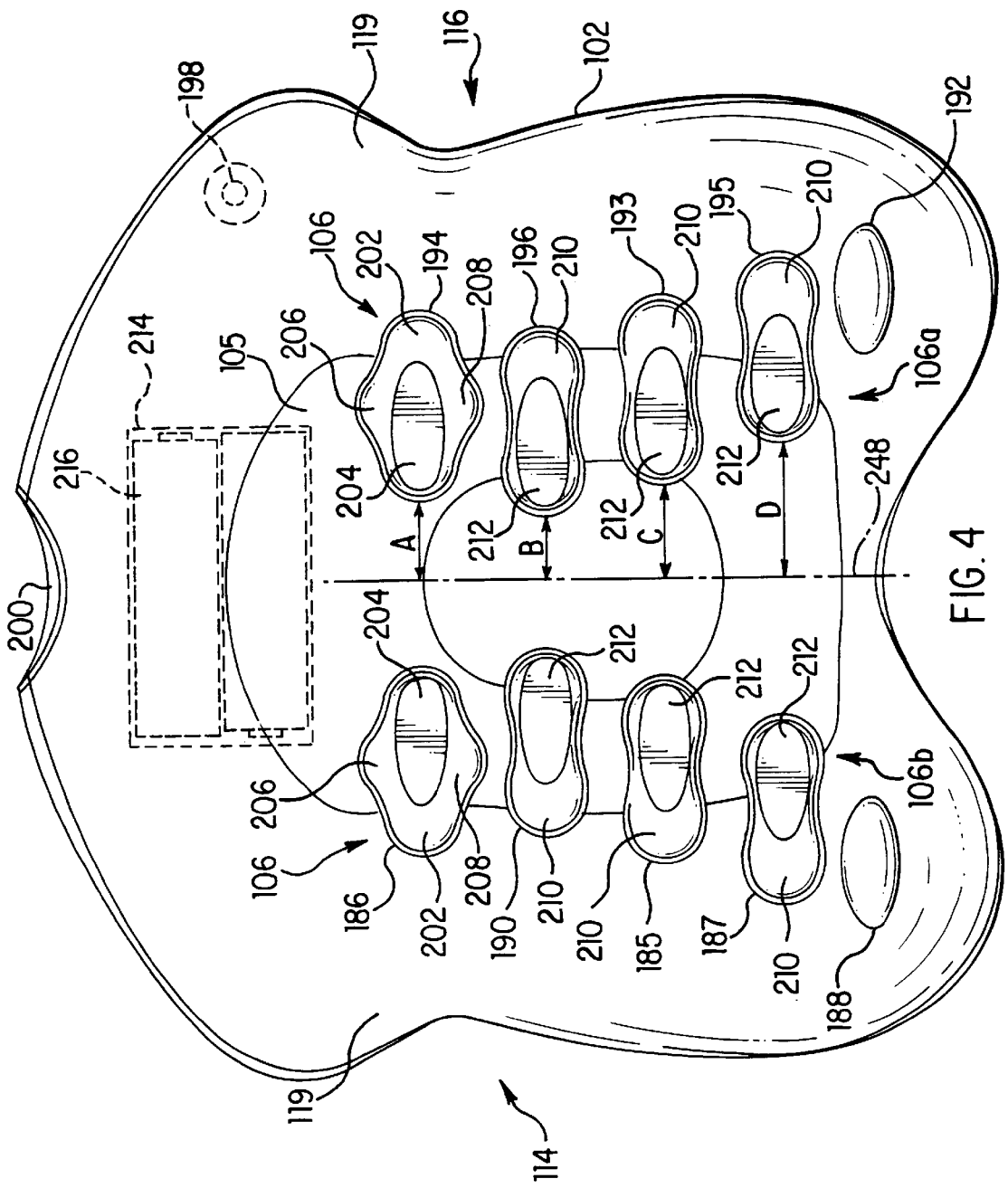

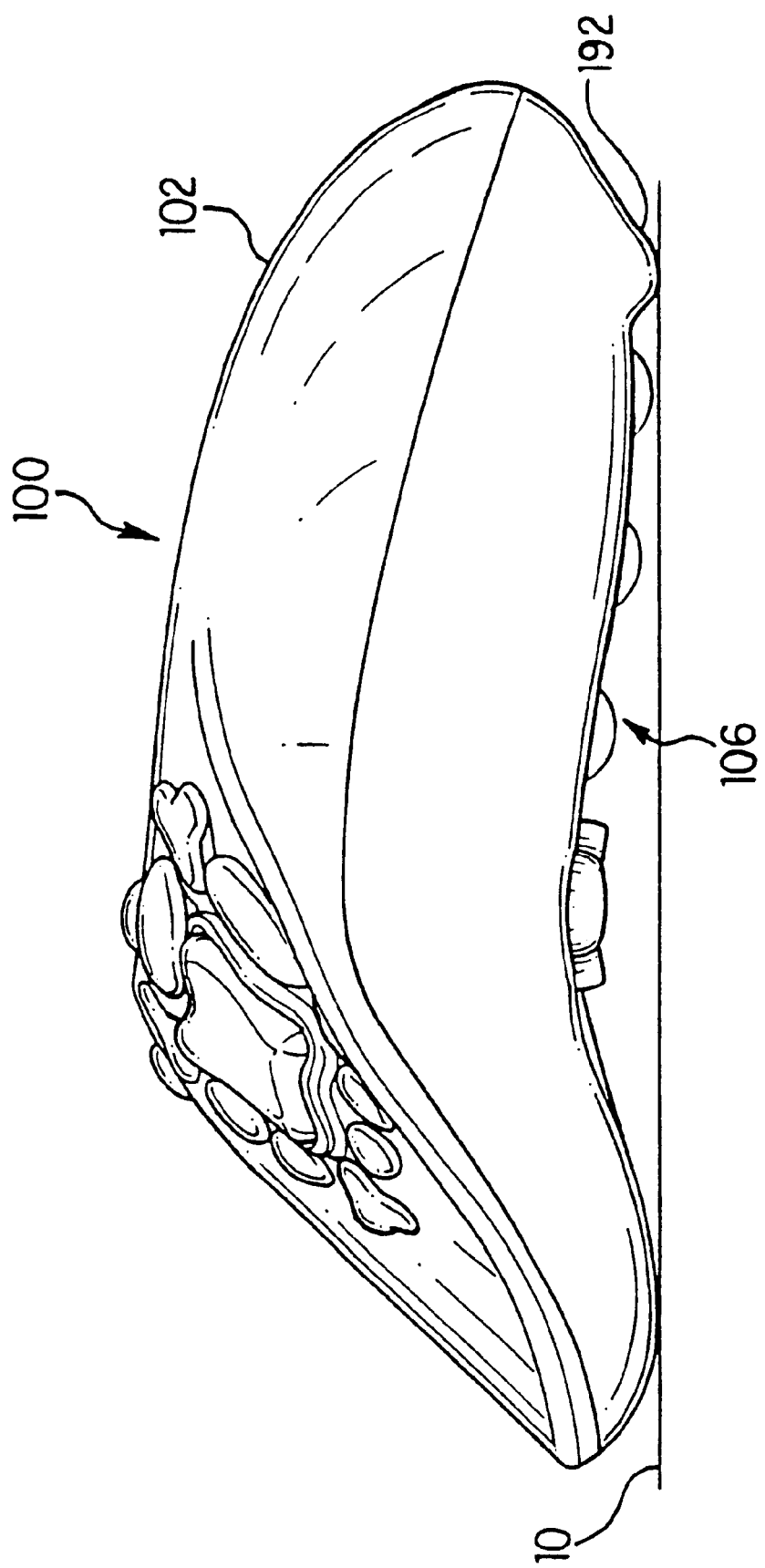

HAND HELD GAMING AND DATA ENTRY SYSTEM

CROSS-REFERENCE TO RELATED PATENT APPLICATIONS

This is a continuation-in-part of patent application Ser. No. 09/118,886, entitled HAND HELD DATA ENTRY SYSTEM, filed 20 Jul. 1998.

BACKGROUND OF THE INVENTION

1. Field of the Invention

This invention directs itself to ergonomic keyboard systems for providing data entry and/or gaming inputs to one or more devices. In particular, this invention directs itself to a hand held gaming and data entry system which can function as a game controller and as an ergonomic keyboard. Still further, this invention directs itself to a hand held system having an ergonomic housing having first and second upper surface portions supporting a plurality of first surface controls. The ergonomic housing further includes another surface having a plurality of second surface controls. More in particular, this invention pertains to a hand held system wherein the first surface controls and the second surface controls can be operated independently, for producing character codes without chording, to generate all of the lower case characters of an alphabet. Obviously, generation of upper case characters requires the use of a SHIFT or CAPS LOCK key in combination with the key switch for a particular character.

2. Prior Art

Keyboard data entry systems and game controllers are known in the art. The best prior art known to the Applicants include U.S. Pat. Nos. 5,493,654; 5,486,058; 5,481,263; 5,479,163; 5,451,053; 5,432,510; 5,426,449; 5,408,621; 5,332,322; 5,317,505; 5,207,426; 5,160,919; 5,137,384; 4,917,516; 4,655,621; 4,552,360; 4,533,446; 4,727,478; 4,680,577; 4,518,164; 4,516,939; 5,443,789; 4,442,506; 4,360,892; 3,990,565; German Patent #30804; PCT Publication #WO86-05143; European Published Patent Application #EP213022; the publication entitled "Semicaptive Keyboard", *Xerox Disclosure Journal*, Vol. 1, No. 2, Feb. 1976, and, the publication entitled "Hand-held Data Input Device", *IBM Technical Disclosure Bulletin*, Vol. 26, No. 11, April 1984.

Some prior art systems, such as that shown in U.S. Pat. Nos. 3,990,565; 5,137,384; 5,160,919; and, 5,426,449 are directed to ergonomic keyboard systems wherein the user's hands are substantially vertically oriented when the keyboard is used. Such systems disclose utilizing somewhat standard QWERTY keyboard formats, as opposed to a format which is capable of higher speed data entry. However, such systems do not disclose an ergonomic housing that is adapted to be supported by the two hands of the user while the user operates the key switches during data entry.

Over the years, many prior art systems have presented alternatives to the QWERTY format as a means of increasing typing speed. While those systems would permit a user to type faster, they required a user to learn the new keyboard layout. In spite of the potential typing speed increase, the public has been loath to adopt any keyboard format other than the old QWERTY arrangement. It is clear that once typists become familiar with a keyboard layout, a promised increase in typing speed is not sufficient motivation to learn an additional keyboard arrangement.

During the past decade there has been a tremendous growth in the use and ownership of computers, game software and video game systems. As a result, children and young adults have become very accustomed to handling and using game controllers that incorporate multidirectional switches. This growing portion of the keyboard-using population is more likely to adopt a keyboard format that is arranged like a game controller, can function as a game controller, is ergonomically designed, allows users to enter data while seated in a reclined position away from a desk, and offers greater typing speed. The likelihood of the instant invention being adopted by a large segment of the keyboard-using public is further enhanced by the fact that all of the alphabetic characters of an alphabet (lower case) can be generated without the use of chording (the simultaneous operation of two or more keyboard switches).

SUMMARY OF THE INVENTION

A hand held gaming and data entry system is provided. The hand held gaming and data entry system includes a housing contoured to be grasped by two hands of a user. The housing has an first surface portion and a pair of hand grip portions extending from the first surface portion to a displaced second surface portion of the housing. The contour of the housing includes a pair of recessed portions disposed on opposing sides, in the hand grip portions, for contiguous contact with a portion of the user's hands. The hand held gaming and data entry system also includes a first set of pushbutton switch controls disposed on the first surface portion of the housing for operation by the user's thumbs to output signals representing a first portion of alphabetic characters of an alphabet. Additionally, the hand held gaming and data entry system includes a second set of switch pushbutton controls disposed on the hand grip portion of the housing for operation by the user's fingers to output signals representing a second portion of alphabetic characters of the alphabet.

It is therefore a feature of the invention to provide a two-handed keyboard with switch pushbutton groupings and/or multidirectional switches to provide high speed data entry, ergonomically.

It is another feature of the invention to provide an easy to learn keyboard system that is faster to learn than the QWERTY keyboard, as the user's fingers and thumbs can generate all of the alphabetic characters without their displacement from the respective HOME switch pushbutton assemblies or groupings.

It is a further feature of the invention to provide a hand held gaming and data entry system which frees the user from having to provide data entry at a desk, or with an apparatus balanced on the user's lap.

These and other advantages and novel features of the invention will become apparent from the following detailed description when considered in connection with the accompanying drawings.

BRIEF DESCRIPTION OF THE DRAWINGS

FIG. 3 is a top plan view of the present invention;

FIG. 4 is a bottom plan view of the present invention;

FIG. 5 is a side elevation view of the present invention;

DESCRIPTION OF THE PREFERRED EMBODIMENTS

Figure 1:
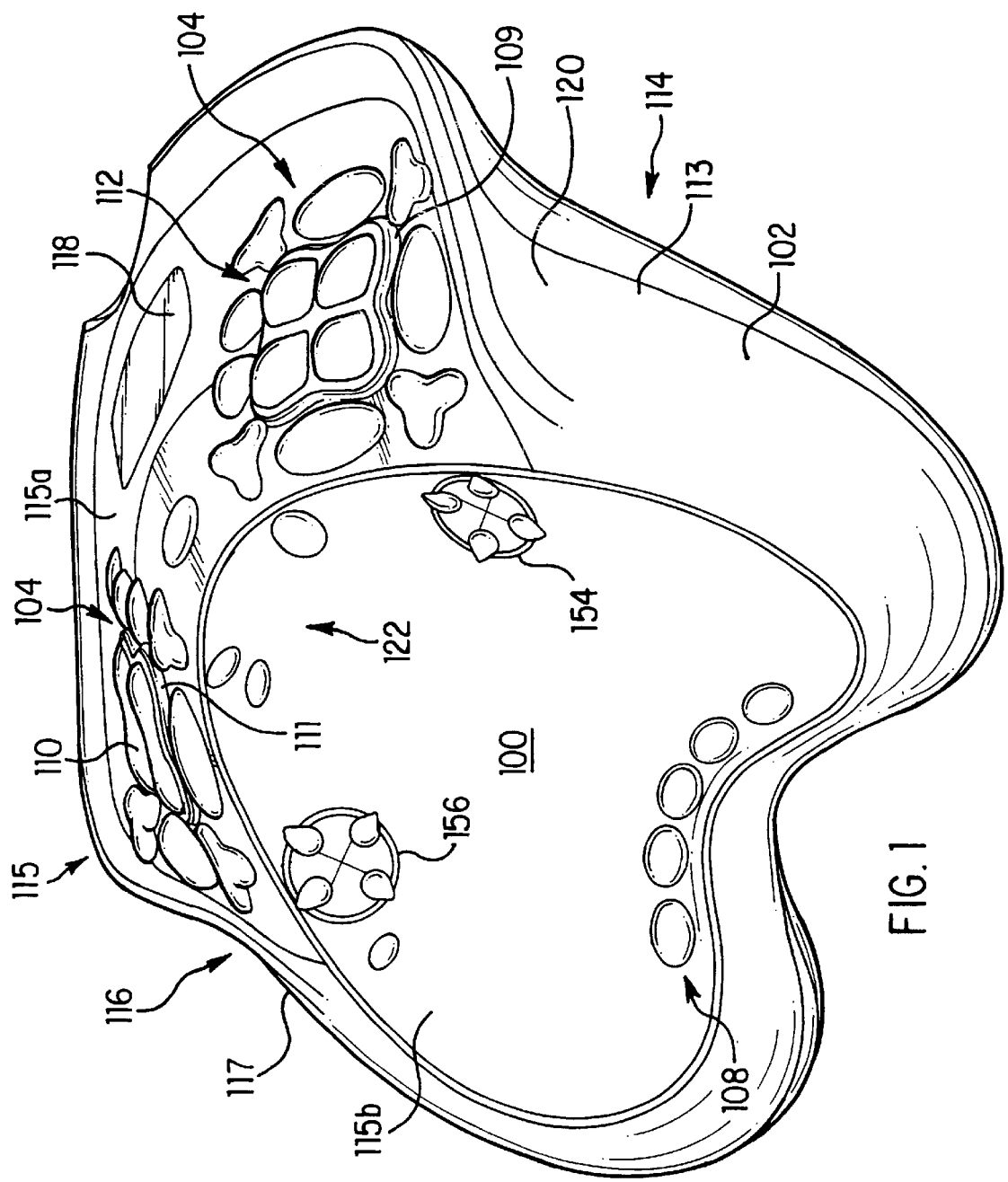
FIG. 1 is a top perspective view of the hand held gaming and data entry system according to the present invention.

Referring now to FIGS. 1–6, there is shown hand held gaming and data entry system 100, 100', 100" which combines an ergonomic housing 102 with a unique arrangement of switch operators, the buttons used to actuate one or more switches. Hand held gaming and data entry system 100, 100', 100" is specifically directed to the concept of providing a keyboard data entry device which can be held easily by the two hands of the user while the user makes use of the first surface controls 104 and second surface controls 106. Hand held gaming and data entry system 100, 100', 100" functions as a fully functional 101 key keyboard for communication with a computer system 300. Further, gaming and hand held data entry system 100, 100', 100" provides a single data entry device capable of communicating with a computer to provide keyboard entry thereto, as well as providing an interface with the computer's game, serial or parallel port. Additionally, the hand held gaming and data entry system 100, 100', 100" may be utilized for communicating with dedicated internet devices, telephone equipment, and various entertainment devices, such as televisions, VCRs, etc.

Figure 2:
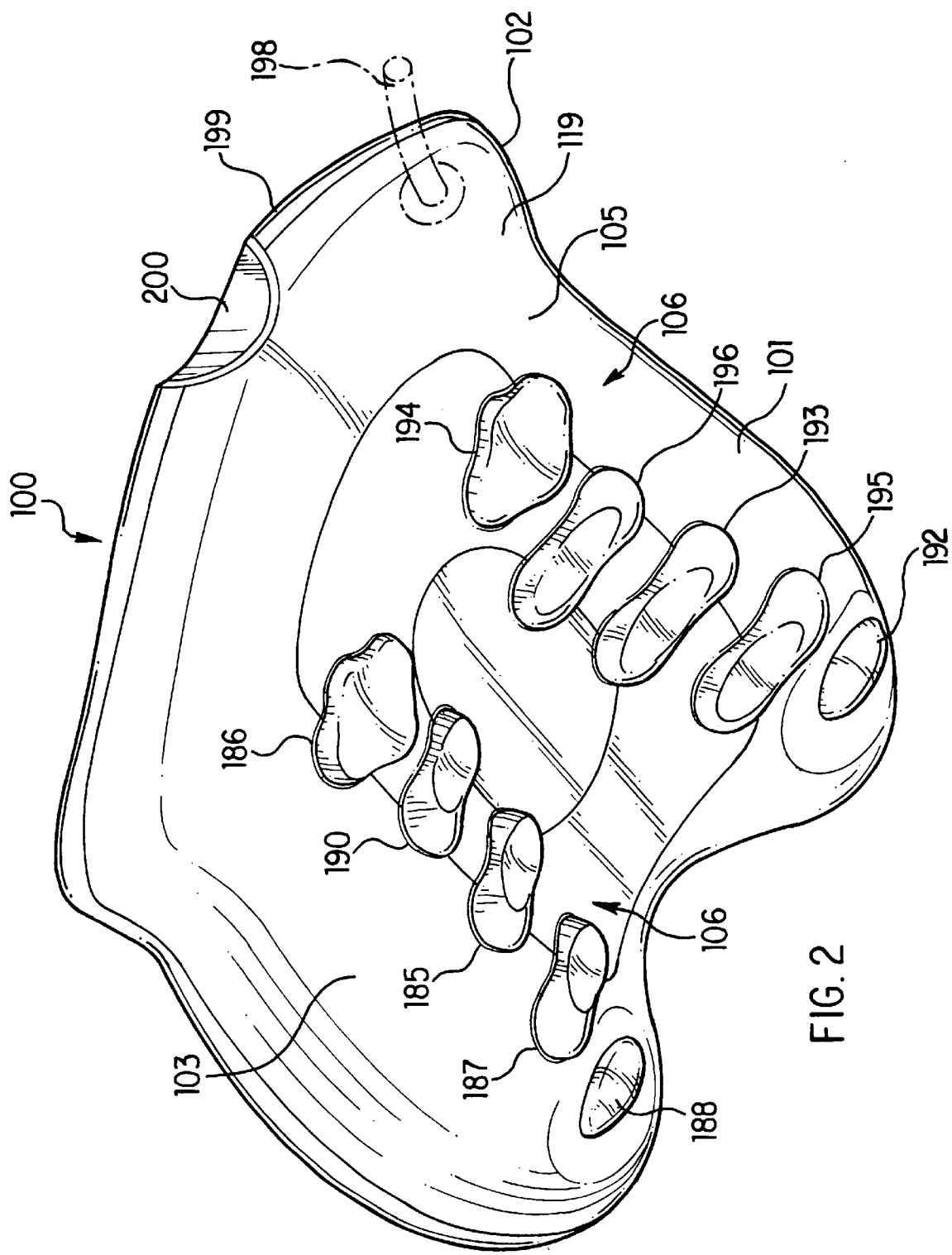
FIG. 2 is a bottom perspective view of the present invention.

Referring now to FIGS. 1 and 2, hand held gaming and data entry system 100 is packaged within an ergonomic housing 102 having a lower surface 105 and an upper surface 115 defined by a first upper surface portion 115a and a second upper surface portion 115b extending angularly from a proximal edge of the first upper surface portion 115a. Housing 102 further includes hand grip portions 114 and 116 formed in respective side sections 113, 117 and the lower surface 105. These side sections 113 and 117 provide a transition between the upper surface portions 115a, 115b and the lower surface 105. In particular, that transition includes a recess 120 that provides for contiguous contact with a first dorsal interosseous portion of a user's hands. The hand grip portions 114, 116 also include a portion of the lower surface 105 which is ergonomically contoured to allow the fingers of the user to wrap around those hand grip portions 101, 103 of the lower surface, with the distal ends of the fingers disposed in contact with respective finger operated controls 106. In addition to the finger operated controls 106, the housing 102 includes thumb operated controls 104 disposed in the first upper surface portion 115a. Additional thumb operated controls are also disposed in the second upper surface portion 115b. All of the controls disposed on the first upper surface portion 115a and second upper surface portion 115b are intended to be individually operated by one or both thumbs of the user. The first upper surface portion 115a is provided with a display 118, which may include an LED, electroluminescent, or the like, display for indicating the particular operating mode of the hand held gaming and data entry system 100, and may include the display of a predetermined number of entered characters. Display 118 may also include light emitting diode indicators for indicating the enablement of the NUMBER LOCK, SHIFT LOCK, and SCROLL LOCK functions.

The primary data entry controls of thumb operated controls 104 include a multidirectional switch assembly 110, commonly known as a D-pad, and a multiple switch grouping 112. D-pads are well known in the game controller art, and function to provide particular contact closures depending upon where the user applies pressure on an operating button thereof. When the user depresses the uppermost or northern position 130 of the D-pad switch operator 110a, such is equivalent to depressing a key of a standard keyboard. When the user depresses the rightmost or East position 132 of D-pad switch operator 110a, such is equivalent to a different key of a standard keyboard being depressed. Likewise, separate keystroke entries are made by depressing the southern portion 134 and western portion 136. It is possible to provide for yet additional keystroke entries by depression of the D-pad switch operator in portions intermediate the North position 130 and East position 132 or West position 136, and intermediate the South position 134 and the East position 132 and West position 136. The D-pad switch operator 110a is disposed within a raised area 111 of the first upper surface portion 115a. By elevating the D-pad switch operator 110a on the raised area 111, such permits a user to easily identify the location of the D-pad tactilely.

The multiple switch grouping 112 is disposed in a raised area 109, allowing the user to tactilely identify the location of grouping 112. Grouping 112 includes a switch pushbutton 158 disposed in the North position, a switch pushbutton 160 located in the East position, a switch pushbutton 162 located in the South position and a switch pushbutton 164 located in the West position. It should be noted that the multiple switch grouping 112 is utilized for consistency with current game controllers, but could be replaced by a D-pad, like D-pad assembly 110, without departing from the scope of the present invention. Each of the switch pushbuttons 158, 160, 162 and 164 are intended to be operated by the thumb of the user's right hand. It is contemplated that the ergonomic housing 102 would be available in multiple sizes, to provide switch locations in correspondence with the size of a user's hands. Therefore, there may be a small size ergonomic housing 102 for use by children, a medium size ergonomic housing 102 for use by a portion of the user population, and a large size ergonomic housing 102 for use by individuals having larger-than-average hands.

Figure 3:
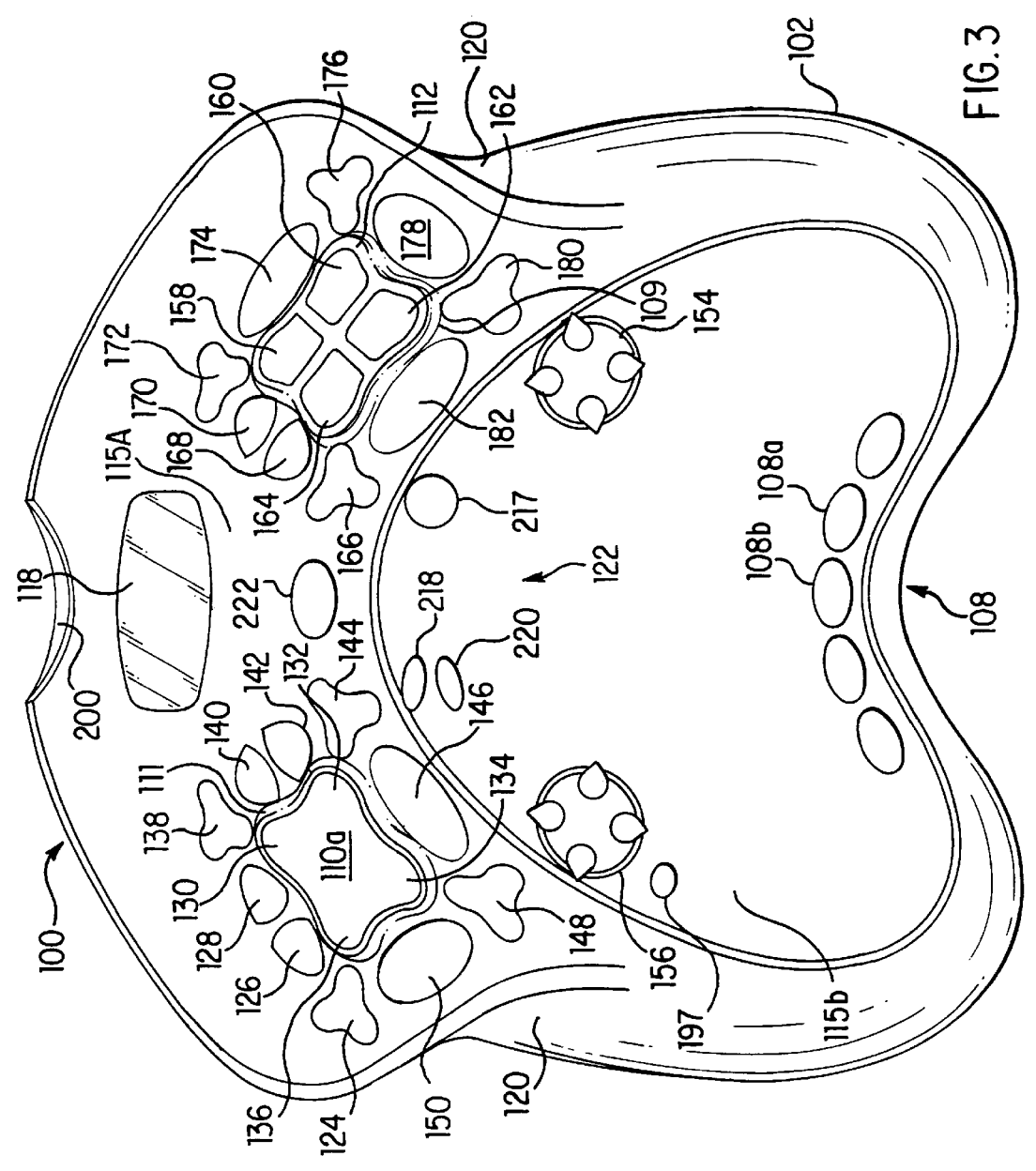

Referring further to FIGS. 1 and 3, the D-pad assembly 110 and multiple switch grouping 112 are each surrounded by additional switch operators to provide for additional keystroke entries utilizing the user's thumbs. Thus, surrounding the D-pad assembly 110 there is provided a first pair of switch pushbuttons 140 and 142 that are radially spaced and disposed intermediate the North D-pad position 130 and the East D-pad position 132. Between the East position 132 and the South position 134 there is a radially spaced switch pushbutton 146, and there is provided a radially spaced pushbutton 150 located between the South position 134 and the West position 136, and further there is provided a pair of radially spaced switch pushbuttons 126 and 128. Further, radially spaced from each of the respective North, East, South and West positions are three directional switch operators 138, 144, 148, and 124, respectively. The three directional switch operators 124, 138, 144 and 148 are essentially mini D-pads, displaceable in each of three different positions to provide signals representative of three different characters. Similarly, the multiple switch grouping 112 is surrounded by radially spaced switch operators.

Between the North position 158 and the East position 160 there is a radially spaced switch pushbutton 174 and between the East position 160 and the South position 162 there is a radially spaced switch pushbutton 178. A switch pushbutton 182 is disposed radially between the South position 162 and the West position 164, and a pair of switch pushbuttons 168 and 170 are disposed radially between the West position 164 and the North position 158. While the switch pushbuttons and operators 126, 128, 138, 140, 142, 144, 146, 148, 150 and 166, 168, 170, 172, 174, 176, 178, 180, 182 have been disclosed as being radially positioned with respect to the D-pad assembly 110 and multiple switch grouping 112, such may be arranged in side-by-side relationship or in angularly spaced relationship. Further, in addition to the three-position switch operators 124, 138, 144, 148, 166, 172, 176 and 180, one or more of the other switch pushbuttons 126, 128, 140, 142, 146, 150, 168, 170, 174, 178, and 182 may be associated with multi-position switches, and in particular, may be associated with two-position switches wherein one keystroke is accomplished by depressing one end of the switch pushbutton and a separate keystroke is enabled by depression of the opposing end, as in a rocker type switch.

The thumb operated controls 104 may also include a pair of multidirectional switches 154 and 156, disposed on the second upper surface portion 115b of ergonomic housing 102. Multidirectional switch 154 may be a cursor displacement control switch for inputting one of four directional inputs for use by a computer as an input for moving the cursor on a display screen. Multidirectional switch 156 may be utilized as a page/file displacement control switch to provide the PAGE UP, PAGE DOWN, HOME and END functions when system 100 is in a keyboard mode. Those switches may serve other functions when system 100 is in other than a keyboard mode. Mode selection controls 108 are defined by a plurality of switch pushbuttons, including switch pushbuttons 108a and 108b used for selecting the operating mode of system 100, such as the keyboard mode, the game controller mode, or other device controller mode. While each of the available modes may be initiated through actuation of an individual switch pushbutton, a single switch pushbutton 108a may be utilized to cause the available modes to be displayed on display 118, and then selected using switch 108b, to select a mode that is highlighted on the display. The method of highlighting the mode to be selected is conventional, utilizing cursor control switch 154, the cursor pointing device 117, or entry of a particular numeral associated with the desired mode.

Cursor positioning control 122 is located on the second upper surface portion of housing 102, adjacent to its interface with first upper surface portion 115a. Cursor positioning control 122 includes a pointing device, which may be a track ball, a track point, a track pad or some other cursor displacement input device 217 and a pair of switch pushbuttons 218 and 220, which function like mouse pushbutton switches.

Figure 1A:
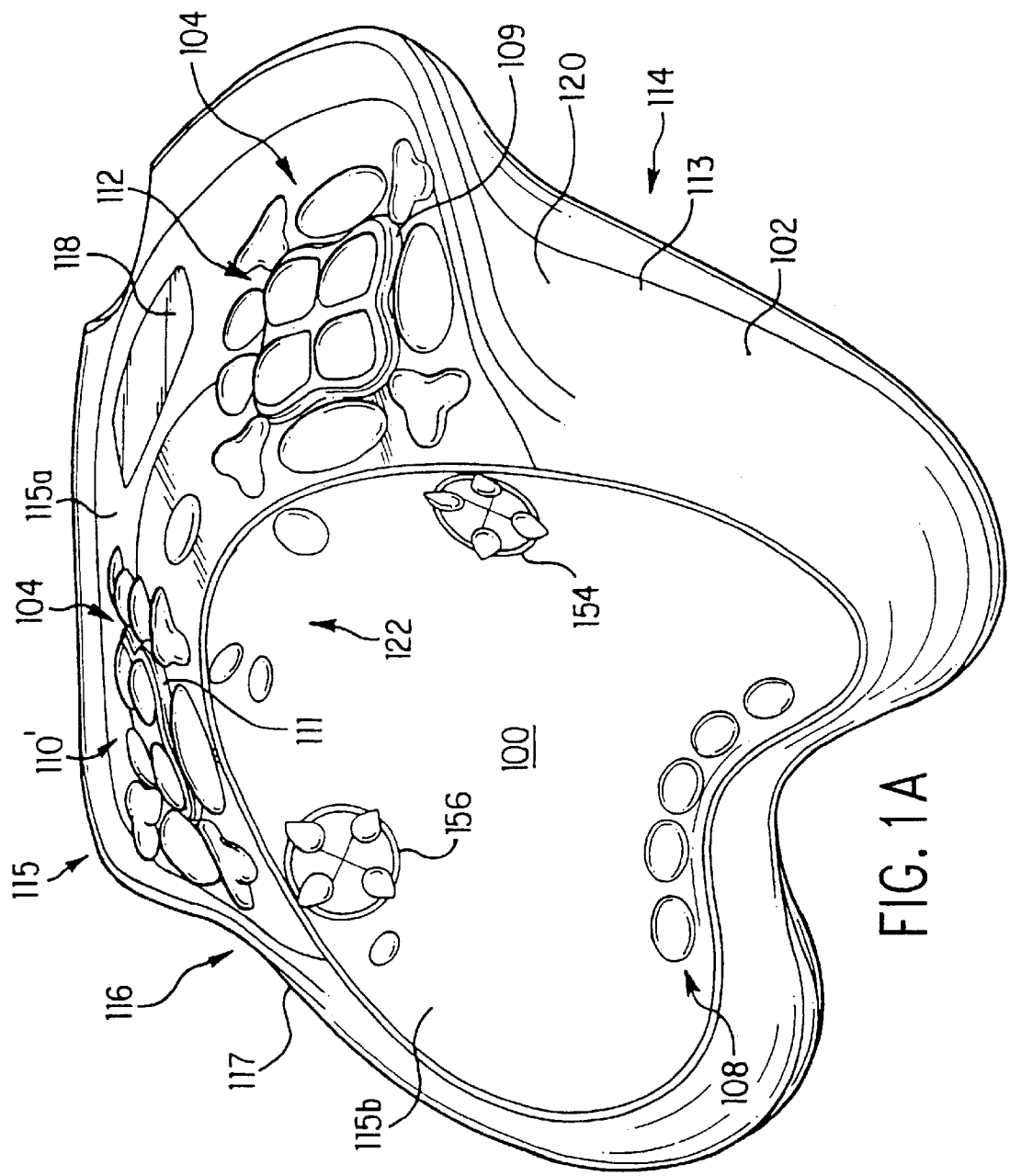
FIG. 1A is a top perspective view of another configuration of the present invention.
Figure 3A:
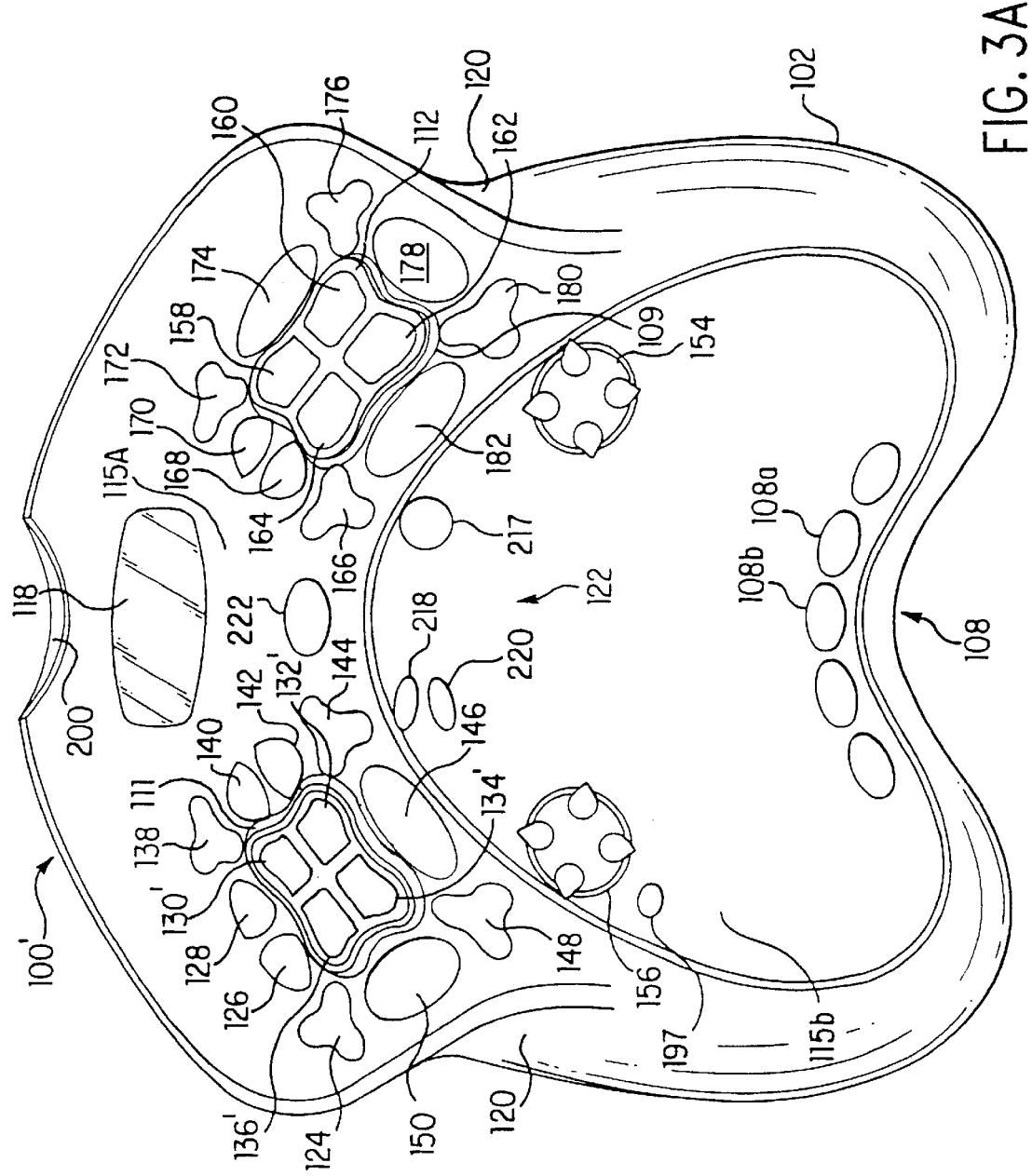
FIG. 3A is a top plan view of the configuration of the present invention shown in FIG. 1A.

Referring to FIGS. 1A and 3A, there is shown an alternate configuration of the thumb operated controls 104. Gaming and data entry system 100' includes a multiple switch grouping 110' instead of a D-pad operator. Switch grouping 110' may be implemented by a plurality of individual switches, or a D-pad where the switch operator includes four protruding portions extending through respective openings in the housing, so as to give the appearance of multiple individual switches. The grouping of individual switches are disposed so as to allow the user's thumb to actuate a selected switch with only a small displacement of the user's thumb. That small displacement is substantially equivalent to the movement required to operate a corresponding multidirectional switch.

When the user depresses the uppermost or northern switch operator 130' of the grouping 110', such is equivalent to depressing a key of a standard keyboard. When the user depresses the rightmost or East switch operator 132' of the grouping 110', such is equivalent to a different key of a standard keyboard being depressed. Likewise, separate keystroke entries are made by depressing the southern switch operator 134' and western switch operator 136'. The switch grouping 110' is disposed within a raised area 111 of the first upper surface portion 115a.

Referring now to FIGS. 2, 2A, 4 and 4A, a view of the lower surface 105 of the ergonomic housing 102 of the hand held gaming and data entry system 100 is shown in order to depict the finger operated controls 106, 106'. While surface 105 is being referred to as a lower surface, it need not be disposed directly below and/or in parallel with surface 115. The hand grip portions 114 and 116 include the angularly offset lower surface portion 119 that in combination with the respective recesses 120 (shown in FIGS. 1 and 3) provide the means by which the user's hands can wrap around the ergonomically contoured lower surface adjacent the respective side sections 113, 117 to support the ergonomic housing 102 while the user's fingers are operating the finger operated controls 106, 106', such support being accomplished by contiguous contact between the first dorsal interosseous portion of the user's hands and the recesses 120 and portions of the angularly offset lower surface portion 119. As shown in the Figures, each of the switch operators which define the finger operated controls 106, 106' are positioned so as to be ergonomically operable by a respective digit of a user's hand. Thus, the distance A, B, C and D between an interior end of a respective switch operator and a center line 248 are each different. Thus, the spacing A between the switch operator 194, 2041', actuated by a forefinger, is greater than the spacing B of switch operator 196, 2121, the switch operator actuated by the middle finger, since the middle finger is typically longer than the forefinger. The spacing A is less than the spacing C and the opening D of the switch operator 193, 2123, the ring finger actuated switch operator, and 195, 2125, the pinky or little finger actuated switch operator. The finger operated controls 106, 106' are divided into one set of switch operators 194, 196, 193 and 195; 2041, 2061, 2021, 2081, 2121, 2101, 2123, 2103, 2125, and 2105 which define the left hand operated switch operators 106a 106a', while the switch operators 186, 190, 185 and 187; 2022, 2062, 2042, 2082, 2102, 2122, 2104, 2124, 2106, and 2126 define the right hand operated switch operators 106b, 106b'. As the left and right hand operated switch operators 106a, 106a' and 106b, 106b' are symmetrically arranged about the center line 248, the same differential spacing applies to switch operators 186, 190, 185 and 187; 2022, 2062, 2042, 2082, 2102, 2122, 2104, 2124, 2106, and 2126.

As will be discussed in following paragraphs, with respect to FIGS. 2 and 4, each of the switches which make up the finger operated controls 106 are multi-position switches. Each of the forefinger actuated switch operators 186 and 194 provide for four position switch functions. Therefore, when the distal longitudinal end is depressed, signals representing a first character are generated, signals representing a second character are generated when the proximal longitudinal end of the switch operator is depressed, while a third signal representing yet another character is generated when the switch operator is displaced transversely, upwardly, and a fourth signal representing yet a different character is generated when the switch operator is displaced transversely in a downward direction. As will be discussed in following paragraphs, the switch operators 186 and 194 are contoured to cradle a user's finger therein and make it easier to displace the switch pushbutton in each of the four directions. Each of the switch operators 190, 185, 187, 196, 193 and 195 are associated with two-position switch functions, providing one keystroke when the user depresses a first end of the switch operator, defined by a recess 212, and another keystroke when the user depresses the opposing second end of the switch operator, defined by the convex portion 210. Like the switch operators 186 and 194, the two-position switch operators 190, 185, 187, 196, 193 and 195 are each contoured to cradle the user's finger and make it easier for the user to operate the switch assembly associated therewith.

Figure 2A:
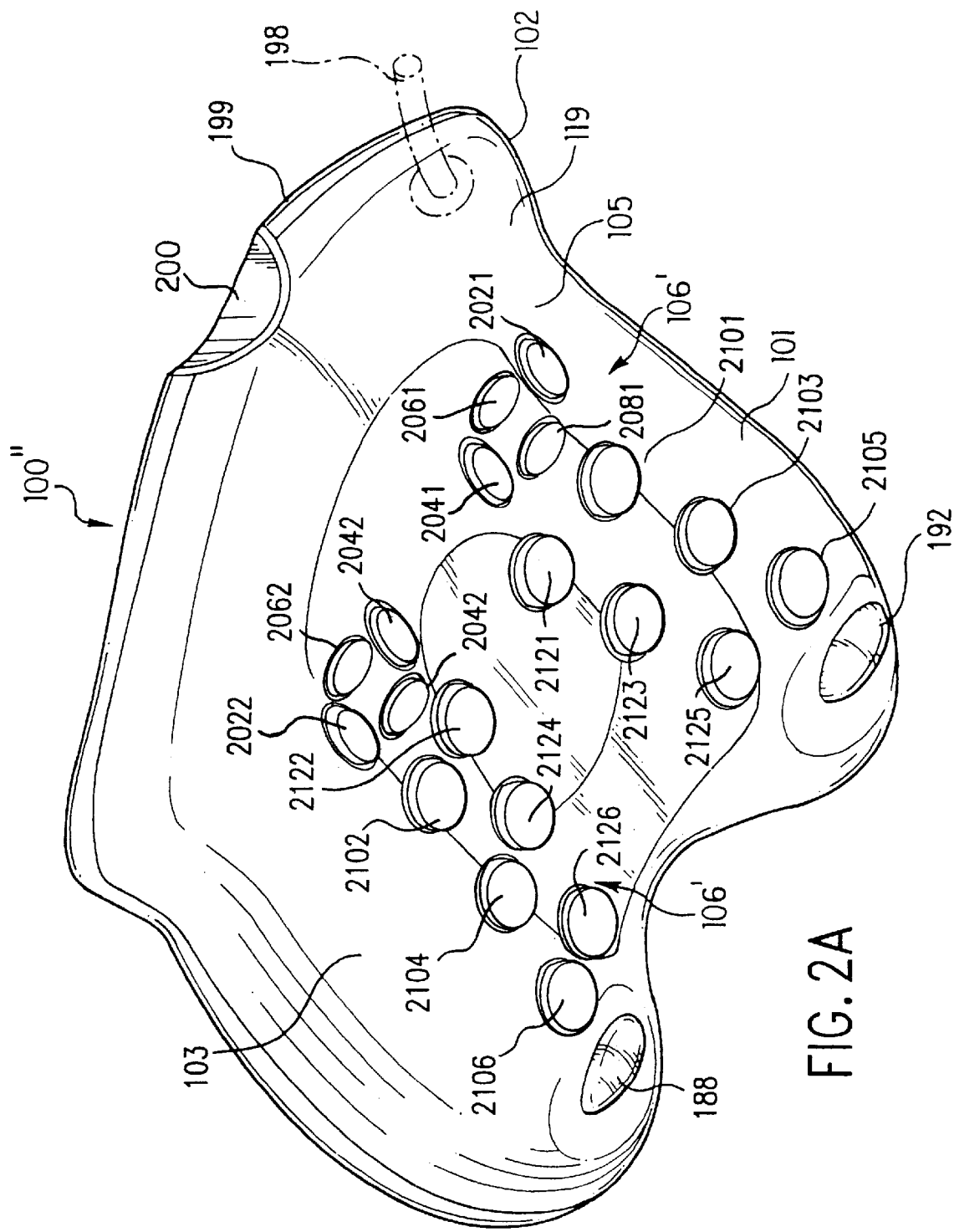
FIG. 2A is a bottom perspective view of yet another configuration of the present invention.
Figure 4A:
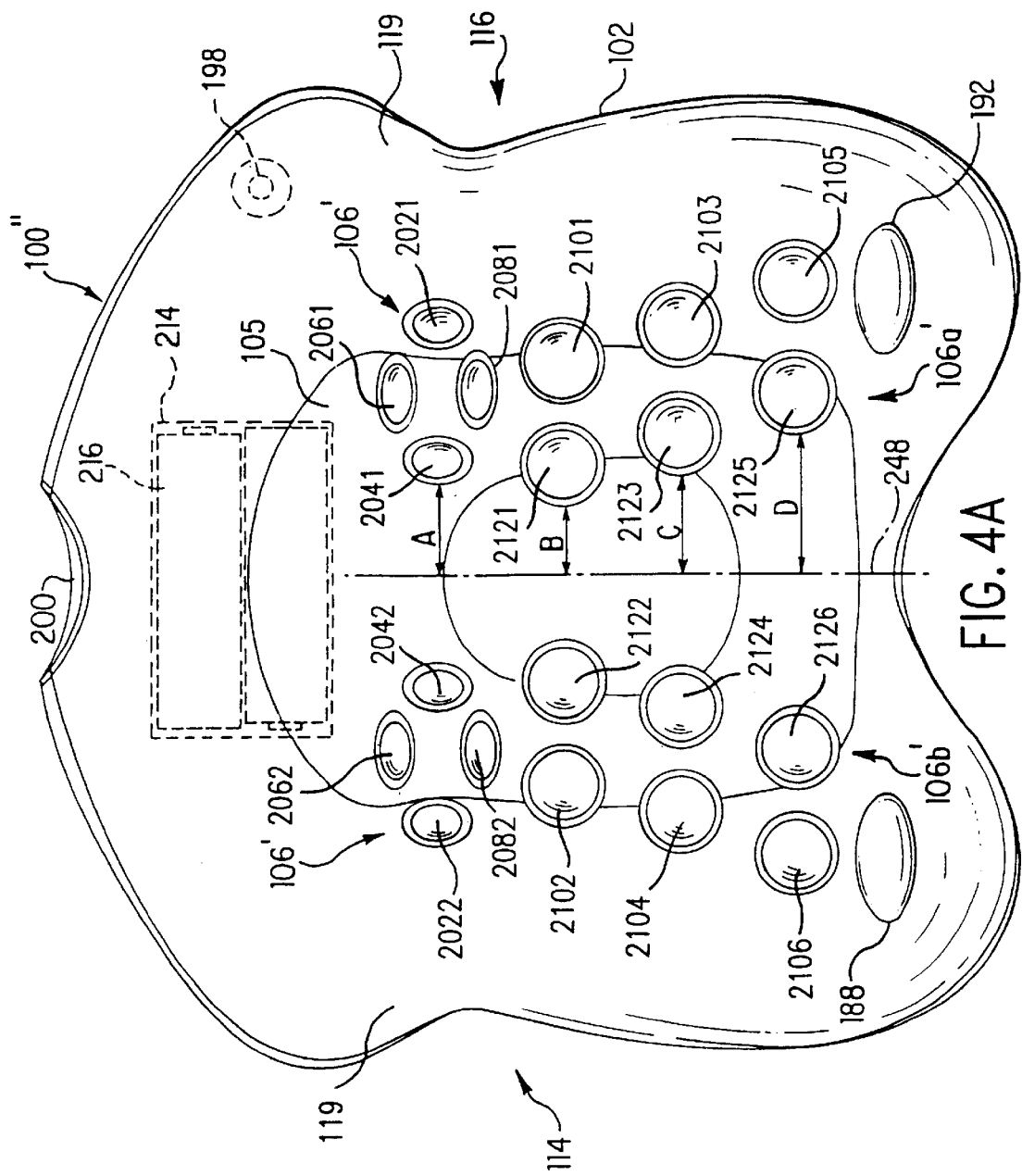
FIG. 4A is a bottom plan view of the configuration of the present invention shown in FIG. 2A.

Referring to FIGS. 2A and 4A, a plurality of individual switches may make up the finger operated controls 106' of gaming and data entry system 100". While the use of switch grouping 110' and finger operated controls 106' have been shown in independent embodiments, those switch schemes may be combined without departing from the inventive concepts set forth herein. Each of the user's forefingers are provided with four switches 2041, 2061, 2021, 2081 and 2022, 2062, 2042, 2082 that may be actuated to provide different character generation functions. The respective groupings of individual switches are disposed so as to allow the user's forefingers to actuate a selected switch with only a small displacement of the user's forefinger. That small displacement is substantially equivalent to the movement required to operate a corresponding multidirectional switch. That same concept is also used in conjunction with the switch groupings for the other fingers. Each of the user's other fingers can selectively actuate one of two switches 2102 and 2122, 2121 and 2101, 2104 and 2124, 2123 and 2103, 2106 and 2126, 2125 and 2105 respectively associated therewith to provide a corresponding keystroke when depressed.

The lower surface 105 of the ergonomic housing 102 is also provided with a pair of feet defined by a respective pair of protrusions 188 and 192 spaced from the pinky operated switch operators 187 and 195, respectively. A distal portion of the angular offset lower surface 119, in combination with the feet 188 and 192, provide a support for spacing the finger operated controls 106 above a base surface 10, when the housing 102 is placed on the base surface 10 by a user, as shown in FIG. 5. Thus, if the user wishes to temporarily discontinue data entry, the housing may be placed down on a work surface without the finger operated controls being inadvertently operated. It is contemplated that users will use system 100, 100', 100" while seated in an easy chair or on a couch, and if the housing 102 is placed on such a soft surface, the feet 188 and 192 may not prevent contact of the soft base surface with at least some of the finger operated controls 106, 106'. Therefore, system 100, 100', 100" includes a PAUSE switch pushbutton 222, shown in FIGS. 3, 3A which alternately disables and enables signal generation by the finger operated controls. Thus, when the user first depresses the PAUSE switch pushbutton 222, subsequent depression of any of the lower surface control switch operators does not cause the output of signals representing characters normally generated thereby. The resumption of signals being output responsive to operation of the finger operated controls 106, 106' is provided by actuation of the PAUSE switch pushbutton 222 a second time.

The lower surface 105 may also include access to a battery holder 214 into which one or more batteries 216 are disposed for operating the electronic circuitry of system 100. System 100, 100', 100" may also be powered from an external source, such power source residing in a device to which the system 100, 100', 100" is coupled, or a separate and distinct power supply.

At a front edge portion 199 of housing 102, bridging between the first upper surface portion 115a and the lower surface angular offset portion 119 there is provided a communications port 200 for providing a wireless interface with one or more systems. Port 200 may consist of an infrared transparent window behind which is disposed one or more photo sensors and infrared emitting devices (not shown), an antenna behind a radio frequency transparent window and respective receiving and transmitting circuits, or a diaphragm coupled to acoustic transmitting and receiving devices. In place of the wireless communications port 200, or in combination therewith, an interface cable may optionally be provided to provide a hard wire coupling with the system with which system 100, 100', 100" is being utilized to enter data. Interface cable 198 has connectors for coupling to a computer's keyboard port and the computer's game port or the controller port of a dedicated game system, on an opposing end thereof. As an alternative to connecting to the personal computer's game port, the interface connection with the personal computer may be by way of the computer's serial or parallel ports, in addition to the keyboard port interface, or the interface cable may provide coupling to an interface bus of the computer.

System 100, 100', 100" may function as a keyboard in one mode, or a game controller in another mode. To select the mode, the user utilizes the mode selection controls 108. The user depresses the mode switch pushbutton 108a in order to display the selected modes on the display 118. The user then utilizes the cursor control switch 154 or pointing device 217 to highlight the desired mode, followed by actuation of the select switch pushbutton 108b. In the keyboard mode, character codes are transmitted from system 100, 100', 100" by independent operation of any of the thumb operated controls 104 and finger operated controls 106, 106'. By use of the thumb operated controls 104 and finger operated controls 106, 106', all of the lower case alphabetic characters of an alphabet can be generated by single individual switch operations, without resorting to chording. Where a combinational key activation (chording) is utilized, system 100, 100', 100" utilizes a cross-coupling technique, wherein a switch closure activated by a user's left thumb is combined with the operation of one of the finger operated controls 186, 190, 185 or 187; 2022, 2062, 2042, 2082, 2102, 2122, 2104, 2124, 2106 or 2126. Conversely, when a switch closure activated by the user's right thumb is to be part of a combinational key activation, such is combined with the operation of one of the switches 194, 196, 193 or 195; 2041, 2061, 2021, 2081, 2121, 2101, 2123, 2103, 2125 or 2105, operated by the digits of the user's left hand. An exemplary representation of a portion of the characters generated by individual and combinational switch activations is shown in Tables 1 and 2. The combinational switch activations shown in the Tables combines controls 104 and 106 with the "SHIFT" function of operators 150 or 178, or "NUM LOCK" switch operator 197. Table 1 identifies the alphabetic characters and certain selected symbols generated utilizing the user's left hand, and Table 2 illustrates the characters and certain selected symbols generated using the user's right hand. The correspondence between particular characters and the switch operator position with which it corresponds has been developed to maximize typing speed. One factor which influenced the particular arrangement shown in Tables 1 and 2, is the frequency of occurrence of the individual letters in the English language, and a matching of the most frequent occurring characters from the HOME positions of the switch operators. Another factor that influences the correspondence of switch operator positions with particular characters is the fact that speed can be increased where consecutive characters are generated using alternate hands. As an example, take the word "the", wherein the letter "t" is generated with the user's forefinger of the right hand, the letter "h" is generated by the thumb of the left hand and the letter "e" is generated using the middle finger of the right hand. Because of the large number of characters and functions carried out through operation of switch operators by the thumb, those alphabetic characters generated through the user's thumbs have been selected to be those which are less common, have a lower frequency of use. The flexibility of the index finger allows each of the user's index fingers to control four-position switch operators, to each generate a selected one of four characters. It should be noted that while Tables 1 and 2 display character assignments for system 100, they also represent corresponding assignments for the embodiments of systems 100' and 100", as well as any combination thereof.

TABLE 1

| Switch | 150 or 178 | 197 |
| --- | --- | --- |
| 130 | j | J |
| 132 | d | D |
| 134 | h | H |
| 136 | b | B |
| 150 | SHIFT | |
| 146 | ENTER | ENTER |
| 194 North | . | . |
| 194 East | o | O | 1 |
| 194 South | k | K | # |
| 194 West | g | G | 9 |
| 196 East | a | A | 3 |
| 196 West | f | F | + |
| 193 East | n | N | 5 |
| 193 West | m | M | * |
| 195 East | r | R | 7 |
| 195 West | c | C | = |

TABLE 2

| Switch | 150 or 178 | 197 |
| --- | --- | --- |
| 158 | q | Q |
| 160 | z | Z |
| 162 | v | V |
| 164 | l | L |
| 178 | SHIFT | |
| 182 | ENTER | ENTER |
| 186 North | , | , | , |
| 186 East | p | P | 0 |
| 186 South | x | X | ENTER |
| 186 West | t | T | 2 |
| 190 West | e | E | 4 |
| 190 East | y | Y | - |
| 185 West | i | I | 6 |
| 185 East | u | U | / |
| 187 West | s | S | 8 |
| 187 East | w | W | $ |

As shown in Tables 1 and 2, all of the lower case alphabetical characters in the English language are generated by individual switch closures, a portion thereof generated by the thumb operated controls 104 and the remaining portion being generated by the finger operated controls 106. All of those alphabetic characters are generated without the user having to displace his or her fingers from the "HOME" switch operators.

In the game controller mode, the thumb operated controls 104 and the finger operated controls 106 provide switch closure input signals that are output to a computer's game port or to the controller input port of a dedicated game system. Thus, the multi-position switch assembly 110 can be utilized for inputting cursor control type inputs and the multiple switch grouping 112 providing individual switch closures that are used by game software to control the firing of weapons, and provide control of particular maneuvers of the game icons, such as jumping, flying, and the like. Similarly, the finger operated controls 106 can be used for input of yet other individual switch closures.

When in a mode to control some other device, such a telephone, dedicated internet connection device, a TV/cable tuner, video entertainment device, or an audio entertainment device, the thumb operated controls 104 and the finger operated controls 106 are utilized to provide the necessary signals to control that device, such as to answer or dial a telephone, move a cursor, change the channel of a tuner, initiate the playing of a video tape or disc, or to change the volume or station on a stereo, as examples. The particular switches of the thumb operated controls 104 and finger operated controls 106 which are utilized to perform those functions, are not important to the inventive concepts embodied herein, and it is contemplated that such assignments may be made programmable, allowing users to make such assignments to suit their own taste.

While the character assignments defined in Tables 1 and 2 provide for high speed typing, it is expected that there will be many current "touch typists" who will not wish to learn that new keyboard layout. Therefore, it is contemplated that a QWERTY compatible key assignment will be made available and such may be stored in a non-volatile memory and selected by a switch or selection display like that used to select the mode. The QWERTY compatible key assignment is shown in Tables 3 and 4. Table 3 identifies the characters generated using the user's left hand, and Table 4 illustrates the characters generated using the user's right hand. Even with a QWERTY compatible character assignment, system 100 provides for faster typing speed due to the fact that the fingers never have to leave the HOME switch operators, they need only slide East and West, or apply pressure to a North or South portion of the switch operators, as appropriate. It should be noted that while Tables 3 and 4 display character assignments for system 100, they also represent corresponding assignments for the embodiments of systems 100' and 100", as well as any combination thereof.

TABLE 3

| SWITCH | 150 or 178 | |
| --- | --- | --- |
| 150 | SHIFT | |
| 146 | ENTER | ENTER |
| 194 North | t | T |
| 194 East | f | F |
| 194 South | g | G |
| 194 West | v | V |
| 196 East | d | D |
| 196 West | e | E |
| 193 East | w | W |
| 193 West | s | S |
| 195 East | z | Z |
| 195 West | a | A |

TABLE 4

| SWITCH | 150 or 178 | |
| --- | --- | --- |
| 178 | SHIFT | |
| 182 | ENTER | ENTER |
| 186 North | n | N |
| 186 East | u | U |
| 186 South | m | M |
| 186 West | j | J |
| 190 West | i | I |
| 190 East | , | , |
| 185 West | o | O |
| 185 East | l | L |
| 187 West | p | P |
| 187 East | q | Q |

Figure 6:
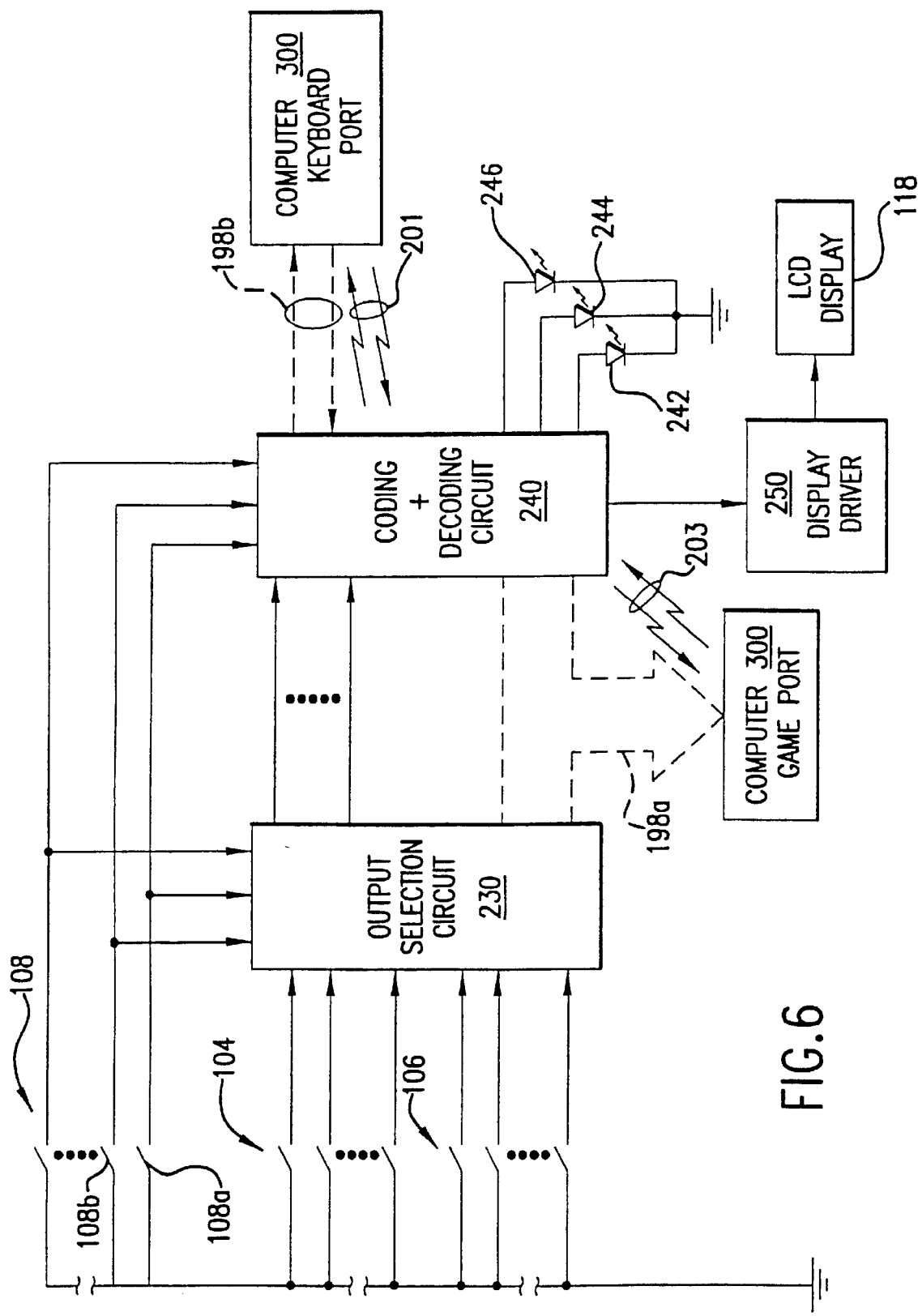
FIG. 6 is a circuit block diagram of the present invention.

Referring to FIG. 6, there is shown a block diagram of the circuit arrangement for coupling the switch closures of the thumb operated controls 104 and the finger operated controls 106, 106' to the appropriate port. As the coding circuitry for converting individual switch closures into the digital character codes utilized by most computers are well known, such are not detailed herein. The coding and decoding circuit block 240 includes the well known circuitry used in conventional keyboards for converting switch closures to character codes and for decoding any control signals which may be supplied from the computer to the keyboard. The coding and decoding circuitry 240 is controlled by input from the mode selection switches 108, allowing different coding schemes to be utilized, depending upon the mode selected, and coupling such to the keyboard port, through the signals 201 of port 200, or a respective portion 198b of the interface cable 198. A connection to the game, serial, or parallel port may be made through cable portion 198a of the interface cable 198 or signals 203 of port 200. The output of the coding and decoding circuitry 240 is also coupled to display driver circuitry 250, which in turn provides an input to the LCD display 118 for indicating the mode of system 100, 100', 100" and the characters generated in predetermined modes. The circuit 240 may be implemented by a microprocessor that is programmed to perform the aforesaid functions. Coding and decoding circuitry 240 also provides an output to several light emitting diodes (LEDs) to indicate the status of certain keyboard functions. In particular, LED 242 may represent the NUM LOCK indicator, the LED 244 may represent the CAP LOCK indicator, and the LED 246 may represent the SCROLL LOCK indicator. LEDs 242, 244 and 246 may also be replaced by particular symbols found on LCD display 118.

In the keyboard mode, the individual contact closures of the thumb operated controls 104 and finger operated controls 106 are coupled to the coding and decoding circuitry 240 by means of an output selection circuit 230. Output selection circuit 230 provides a switching function responsive to the mode of operation selected through the mode selection controls 108. Thus, in the keyboard mode, the switch closures from the thumb operated controls 104 and finger operated controls 106 are passed to the coding and decoding circuitry 240. In a game controller mode, however, at least a portion of the switch closures of the thumb operated controls 104 and finger operated controls 106 can be coupled directly to the game port through the portion 198a of the interface cable 198. In place of the cable portions 198a and 198b, or in combination therewith, connection with the respective port is accomplished utilizing the wireless communications port 200, providing a wireless coupling with the computer, and/or other devices. The output selection circuit may be implemented in a microprocessor, including the same microprocessor as that which may be utilized to implement circuit 240. The output selection logic may then be performed by a particular software module, with the coding and decoding logic being performed by another software module.

In each of the arrangements of system 100, 100' and 100", a pointing device 217 is provided to enable an input for cursor displacement. The pointing device 217 is operated by the thumb of the user's right hand, and a pair of switches 218 and 220 are provided for operation by the thumb of the user's left hand. As mentioned earlier, pointing device 217 may be a track ball, track point, track pad, or other cursor displacement input device. The switches 218 and 220 serve the same function as the switches found on a conventional mouse.

It can be seen that the ergonomic housing 102 has been adapted to be held by two hands of a user. Mounted on the housing are a plurality of switches for operation by the thumb and fingers of the user, wherein all of the lower case alphabetic characters can be generated without the user removing the finger or thumb from a "HOME area". While the user has both thumbs positioned on the respective multidirectional switch 110 and multiple switch grouping 112, and the fingers of each hand respectively on the switch pushbuttons 194, 196, 193, 195, 186, 190, 185 and 187, the housing is supported by contiguous contact between the recessed portions 120 of housing 102 and the first dorsal interosseous portion of each of the user's hands, respectively. The arcuate surfaces of the lower surface 105 also contributes to the ability of a user to support the housing 102 while still making full use of the switch pushbuttons. The contours of housing 102 place the user's hands in a substantially vertical orientation, which is a preferred ergonomic orientation. The switch operators have been contoured to maximize the ergonomic benefit, making it easier to operate the switch operators and to tactilely locate particular switch operators.

Figure 7:
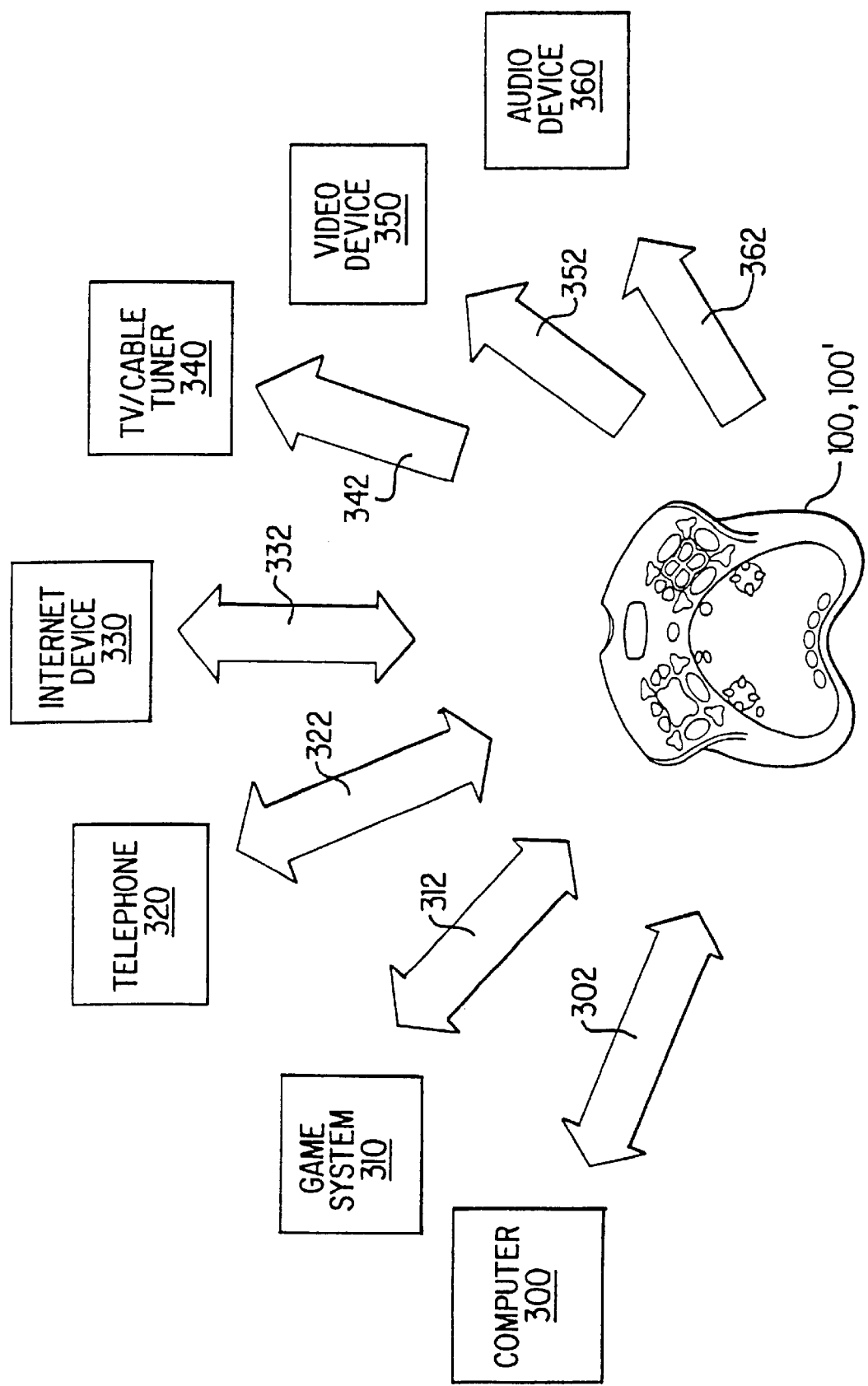
FIG. 7 is a block diagram illustrating the multi-mode functions of the present invention.

Therefore, it can be seen that gaming and data entry system 100, 100', 100" is very versatile and may be utilized to interface with a plurality of entertainment, computational and communications devices, as illustrated in FIG. 7. Gaming and data entry system 100, 100', 100" is intended to communicate with a computer 300, which may be a personal computer, wherein a data link 302 may be established utilizing the interface cable 198 or the wireless communications port 200. When coupled to computer 300, gaming and data entry system 100, 100', 100" may be utilized in a keyboard mode wherein the single and combinational switch closures provided through operation of the thumb operated controls 104 and side surface controls 106, 106' establish signals which are output to the computer to represent alphanumeric characters, punctuation, mathematical operators, and commonly used words such as "the", "to", "and", "of", "for", "in", "with", "that", and "was", for example. When the computer is utilized for playing games, gaming and data entry system 100, 100', 100" is switched into a game controller mode, wherein the same switch closures which previously generated a character code input to the keyboard port of the computer, now are input to the game port as input signals representing directional and operational control signals.

Gaming and data entry system 100, 100', 100" may be coupled directly to a dedicated game system 310, such as the type manufactured by Nintendo, Sega, Sony and others for communication over a data link 312. If the dedicated game system 310 accepts alphanumeric character input codes, gaming data entry system 100, 100', 100" may be utilized in a mode to provide such input. Whether coupled to computer 300 or dedicated game system 310, data entry system 100 may be placed in other device modes for communicating with other systems, such as the telephone system 320 through the data channel 322. When coupled to telephone system 320, the user provides voice input through a microphone (not shown), and receives voice output by means of a speaker (not shown) located in the telephone system 320 or gaming and data entry system 100, 100', 100". Preferably, the communications over the data link 322 would be a wireless communications link such as by use of the communications port 200, which may be an optical, ultrasonic, or a radio frequency communications port disposed within ergonomic housing or base 102. Similarly, gaming and data entry system 100, 100', 100" may be utilized for interface with a dedicated Internet device 330 through a data link 332, to provide the appropriate keyboard character codes and cursor positioning input to the Internet device 330. As previously mentioned, data entry system 100, acting as a wireless remote control, may be utilized to control such home entertainment devices as the TV/cable tuner 340 through data link 342, video device 350 (which may be a video tape recorder, video disc player, or the like) through the data link 352, and the audio entertainment device 360 (which may be a stereo tuner, audio tape deck, CD player, or the like) through the data link 362. The particular data links 302, 312, 322, 332, 342, 352, 362 represent a hardwired or wireless communications path for unidirectional or bidirectional transmission of data, utilizing the appropriate coding for the particular device being communicated with.

Although the invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. A hand held gaming and data entry system, comprising:

a housing contoured to be grasped by two hands of a user, said housing having a first surface portion and a pair of hand grip portions extending from said first surface portion to a second displaced surface portion of said housing, said contour of said housing including a pair of arcuate recessed portions disposed on opposing sides in said hand grip portions;

first control means disposed on said first surface portion for operation by the user's thumbs to output signals representing a first portion of alphabetic characters of an alphabet; and, second control means disposed on said hand grip portions for operation by the user's fingers to output signals representing a second portion of alphabetic characters of the alphabet, said second control means including a plurality of switch operators, a predetermined portion of said plurality of switch operators being respectively disposed in correspondence with a particular one of the user's fingers, said arcuate recessed portions being in respective contiguous contact with a first dorsal interosseous portion of the user's hands to support said housing while the user's thumbs operate said first control means and the user's fingers operate said second control means.

2. The hand held gaming and data entry system as recited in claim 1 where said first control means includes at least one multidirectional switch assembly, said at least one multidirectional switch assembly including a single switch operator displaceable in different directions for output of signals representing different characters responsive to displacement of said switch operator in said different directions.

3. The hand held gaming and data entry system as recited in claim 1 where said first control means includes a plurality of multidirectional switch assemblies, each of said plurality of multidirectional switch assemblies including a single switch operator displaceable in different directions for output of signals representing different characters responsive to displacement of said switch operator in said different directions.

4. A hand held gaming and data entry system, comprising:

a housing contoured to be grasped by two hands of a user, said housing having a first surface portion and a pair of hand grip portions extending from said first surface portion to a second displaced surface portion of said housing, said contour of said housing including a pair of recessed portions disposed on opposing sides in said hand grip portions;

first control means disposed on said first surface portion for operation by the user's thumbs to output signals representing a first portion of alphabetic characters of an alphabet, said first control means including a grouping of at least four switch operators disposed in correspondence with a each of the user's thumbs, each of said switch operators being displaceable for output of signals representing different characters responsive to which of said switch operators in said grouping is displaced; and, second control means disposed on said hand grip portions for operation by the user's fingers to output signals representing a second portion of alphabetic characters of the alphabet, said arcuate recessed portions being in respective contiguous contact with a first dorsal interosseous portion of the user's hands to support said housing while the user's thumbs operate said first control means and the user's fingers operate said second control means.

5. The hand held gaming and data entry system as recited in claim 4 where said second control means includes a plurality of multidirectional switch assemblies, each of said plurality of multidirectional switch assemblies including a single switch operator displaceable in different directions for output of signals representing different characters responsive to displacement of said switch operator in said different directions.

6. A hand held gaming and data entry system, comprising:

a housing contoured to be grasped by two hands of a user, said housing having an upper surface portion and a pair of hand grip portions extending from said upper surface portion to a lower side of said housing, said upper surface portion being formed by a first section and a second section, said second section extending angularly downwardly from a proximal edge of said first section, said contour of said housing including a pair of arcuate recessed portions disposed on opposing sides in said hand grip portions for contiguous contact with a portion of the user's hands to support said housing during use of said data entry system;

first control means disposed on said upper surface portion for operation by the user's thumbs to output signals representing a first portion of alphabetic characters of an alphabet, said first control means including a plurality of first switches disposed on said first section of said upper surface portion and at least one second switch disposed on said second section of said upper surface portion, and at least one second switch outputting signals corresponding to cursor control signals; and, second control means disposed on said hand grip portions for operation by the user's fingers to output signals representing a second portion of alphabetic characters of the alphabet, said second control means including a plurality of switch operators, a predetermined portion of said plurality of switch operators being respectively disposed in correspondence with a particular one of the user's fingers.

7. The hand held gaming and data entry system as recited in claim 6 further comprising a display disposed on said upper surface portion for displaying one of a gaming mode and a data entry mode selected by the user.

* * * * *